United States Patent
Sood et al.

(10) Patent No.: US 9,756,148 B2
(45) Date of Patent: Sep. 5, 2017

(54) DYNAMIC HOST CONFIGURATION PROTOCOL RELEASE ON BEHALF OF A USER

(71) Applicant: Aruba Networks, Inc., Sunnyvale, CA (US)

(72) Inventors: Aman Sood, Bangalore (IN); Abhishek Dwivedi, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 190 days.

(21) Appl. No.: 14/483,682

(22) Filed: Sep. 11, 2014

(65) Prior Publication Data

US 2016/0080318 A1    Mar. 17, 2016

(51) Int. Cl.
*H04L 29/06* (2006.01)
*H04L 29/12* (2006.01)
*H04L 12/46* (2006.01)

(52) U.S. Cl.
CPC .......... *H04L 67/42* (2013.01); *H04L 12/4641* (2013.01); *H04L 61/2015* (2013.01); *H04L 61/2053* (2013.01)

(58) Field of Classification Search
CPC ............. H04L 12/4641; H04L 61/2015; H04L 61/2053; H04L 67/42
See application file for complete search history.

(56) References Cited

U.S. PATENT DOCUMENTS

| 7,792,942 B1* | 9/2010 | Regan | H04L 29/12273 370/254 |
| 2004/0071164 A1* | 4/2004 | Baum | H04L 29/12018 370/469 |
| 2009/0193103 A1* | 7/2009 | Small | H04L 12/462 709/221 |
| 2010/0191813 A1* | 7/2010 | Gandhewar | H04L 61/2015 709/206 |
| 2010/0191839 A1* | 7/2010 | Gandhewar | H04L 29/12028 709/220 |

* cited by examiner

*Primary Examiner* — Arvin Eskandarnia
*Assistant Examiner* — Gil H. Lee
(74) *Attorney, Agent, or Firm* — Brooks, Cameron & Huebsch, PLLC

(57) ABSTRACT

The present disclosure discloses a method and a network device for performing DHCP release on behalf of a user in dynamic network environments. Specifically, a network device determines that a client device is no longer using a first Internet Protocol (IP) address assigned to the client device. In response to the determining that the client device is no longer using the first IP address, the network device then generates a Dynamic Host Configuration Protocol (DHCP) release message on behalf of the client device for removing the assignment of the first IP address to the client device. Moreover, the network device transmits the DHCP release message to a DHCP server.

17 Claims, 6 Drawing Sheets

DYNAMIC HOST CONFIGURATION PROTOCOL RELEASE ON BEHALF OF A USER

FIELD

Embodiments of the present disclosure relate to virtual local area network managements. In particular, embodiments of the present disclosure describe a method and network device for performing dynamic host configuration protocol (DHCP) release in network environments.

BACKGROUND

In computer networking, a single layer-2 network may be partitioned to create multiple distinct broadcast domains, which are mutually isolated so that packets can only pass between them via one or more routers. Such a domain is generally referred to as a virtual local area network (VLAN). This is usually achieved on switching or routing network devices. Some devices may support VLAN by partitioning on a port level; other devices can mark packets through tagging so that a single interconnect (trunk port) may be used to transport data for various VLANs. A VLAN has the same attributes as a physical local area network (LAN), but it allows for client devices to be grouped together more easily even if they are connected to the same network switch. VLAN membership can be configured through software. Unlike physically separate networks, VLANs share bandwidth, so VLAN trunks may require aggregated links and/or quality of service prioritization.

The Dynamic Host Configuration Protocol (DHCP) generally refers to a standardized networking protocol used on Internet Protocol (IP) networks for dynamically distributing network configuration parameters, such as IP addresses for interfaces and services. With DHCP, client devices of a network request IP addresses and networking parameters automatically from a DHCP server, reducing the need for a network administrator or a user to configure these settings manually.

In a wireless local area network (WLAN), when a client device belonging to a first VLAN requests an IP address, a network control device will forward the request to the DHCP server corresponding to the first VLAN. The DHCP server will then assign an IP address to lease to the client device. Subsequently, if the client device changes to a different and second VLAN, the client device will request a new IP address from the same or a different DHCP server corresponding to the second VLAN. The VLAN for the client device may change due to change of authorization. For example, a Pre-boot eXecution Environment (PXE) client after boot can undergo an authentication in compliance with IEEE 802.1x standard, and obtain a new role and/or VLAN assignment.

Moreover, the client device will need to send a DHCP release message to the DHCP server to release the assigned IP address as an available IP address to the address pool for the first VLAN. Nevertheless, in such scenarios, the DHCP server cannot properly release the assigned IP address corresponding to the first VLAN to the DHCP available address pool, and thus making the assigned IP address unavailable for other client devices. This is because the VLAN associate with the client device has been changed from the first VLAN to the second VLAN. The DHCP server maintains a VLAN identified associated with each client device. Accordingly, the DHCP server will detect a mismatch between the current VLAN assigned to the client device and the VLAN corresponding to the assigned IP address in the DHCP release message received from the client device. When such mismatch is detected by the DHCP server, the DHCP server will not release the IP address of the DHCP message, thereby causing the DHCP address pool to get exhausted rapidly even though none of the client device is active on the first VLAN and/or sub-network.

DETAILED DESCRIPTION

In the following description, several specific details are presented to provide a thorough understanding. While the context of the disclosure is directed to VLAN management in local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to virtual local area network managements. In particular, embodiments of the present disclosure describe a method and network device for performing dynamic host configuration protocol (DHCP) release on behalf of a user in dynamic network environments.

With the solution provided herein, a network device determines that a client device is no longer using a first Internet Protocol (IP) address assigned to the client device. In response to the determining that the client device is no longer using the first IP address, the network device then generates a Dynamic Host Configuration Protocol (DHCP) release message on behalf of the client device for removing the assignment of the first IP address to the client device. Moreover, the network device transmits the DHCP release message to a DHCP server.

Specifically, an authentication database can maintain user entries for client devices in the dynamic network environment. Each user entry may include attributes, such as, a username, a Media Access Control (MAC) address, a VLAN identifier, an IP address, a flag indicating whether the IP address is dynamically or statically assigned, and/or the DHCP server's host IP address if the IP address is dynamically assigned. Therefore, when the VLAN associated with a client device changes causing the client device being assigned with a new IP address, and the client device is sending traffic using the new IP address, an authenticator (e.g., a network controller device) can send a DHCP release message on behalf of the client device to release the client device's previously assigned IP address. The authenticator can ensure that correct VLAN identifier is included in the DHCP release message, such that the DHCP server can properly release the IP address after receiving the DHCP release message sent by the authenticator on behalf of the user (e.g., client device).

DHCP Pool Exhaustion

Figure 1:
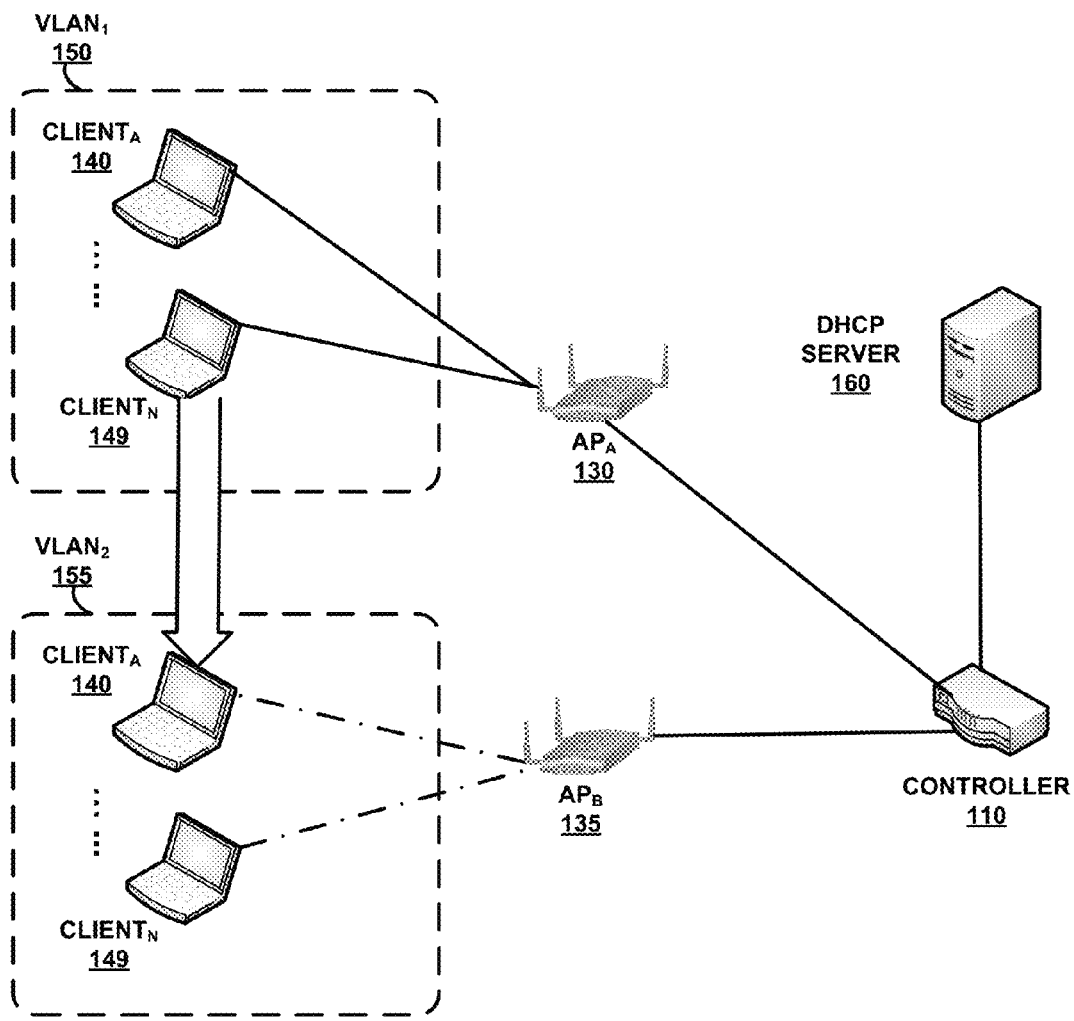
FIG. 1 shows an exemplary network environment according to embodiments of the present disclosure.

FIG. 1 shows an exemplary network environment according to embodiments of the present disclosure. Specifically, FIG. 1 illustrates a network that includes at least a DHCP server 160, a network controller 110, a number of access points (APs) (such as, $AP_A$ 130 and $AP_B$ 135), and a plurality of client devices, such as $Client_A$ 140, ..., $Client_N$ 149, etc.

In addition, wireless local area network (WLAN) illustrated in FIG. 1 is partitioned into a number of virtual local area networks (VLANs). For example, in some embodiments, client devices associated with $AP_A$ 130 are configured as members of $VLAN_1$ 150; and, client devices associated with $AP_B$ 135 are configured as members of $VLAN_2$ 155. In some embodiments, all enterprise client devices are configured as members of $VLAN_1$ 150, and all guest client devices are configured as members of $VLAN_2$ 155. In some embodiments, client devices located in a first facility building are configured as members of $VLAN_1$ 150, and client devices located in a second facility building are configured as members of $VLAN_2$ 155. Although only a few examples are mentioned, it shall be noted that the WLAN can be partitioned into any number of VLANs with any mechanism and without any limitations.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Access points, e.g., $AP_A$ 130 and $AP_B$ 135, generally refer to a set of wireless network devices that allow wireless client devices to connect to a wired network using IEEE 802.11 or related standards. The APs usually connect to a router via a wired network, but can also be an integral component of the router itself.

Each access point serves one or more client devices. Also, each client device may belong to a particular VLAN. For illustration purposes only, assuming that, in FIG. 1, a plurality of client devices, such as $Client_A$ 140, ..., $Client_N$ 149, initially associate with $AP_A$ 130. Moreover, assuming that when each of the client devices associates with $AP_A$ 130, network controller 110 assigns each client device to $VLAN_1$ 150. Therefore, when a client device, e.g., $Client_A$ 140, sends a DHCP request, $AP_A$ 130 will forward the request to DHCP server 160 based on the corresponding VLAN assignment to $Client_A$ 140.

Next, DHCP server 160 will assign an available IP address to $Client_A$ 140 upon receiving the DHCP request. The available IP address will be selected from an address pool that is reserved for $VLAN_1$ 150 and maintained by DHCP server 160.

Now, one or more client devices, such as $Client_A$ 140, ..., $Client_N$ 149, change to a new sub-network (a new VLAN). The VLAN assigned for the one or more client devices may change due to a change of authorization. For example, a Pre-boot eXecution Environment (PXE) client after boot can undergo an authentication in compliance with IEEE 802.1x standard, and obtain a new role and/or VLAN assignment.

As a result, the one or more client devices will each send a new DHCP request for a new IP address that corresponds to the new VLAN. In some embodiments, as illustrated in FIG. 1, the client devices may disassociate with $AP_A$ 130 and establish association with another AP (e.g., $AP_B$ 135) after VLAN changes. In some embodiments, the one or more client devices may remain to associate with $AP_A$ 130, but communicating with the network using a new IP address corresponding to the newly assigned VLAN.

In this example, network controller 110 determines that client devices belong to a new VLAN, e.g., $VLAN_2$ 155, after the change of authorization (CoA). Therefore, each client device will need to send a new DHCP request to request for an available IP address corresponding to the new VLAN. When DHCP server 160 receives the new DHCP requests from the client devices, DHCP server 160 will assign an available IP address from an address pool that is reserved for $VLAN_2$ 155 to each client device.

Nevertheless, because DHCP server 160 typically does not release an IP address until the lease period expires, the IP addresses previously assigned to the client devices corresponding to $VLAN_1$ 150 will remain to be unavailable until the predetermined lease period is over or until the DHCP server receives a valid DHCP release message from the client device.

In this case, even if DHCP server 160 received a DHCP release message from the one or more client devices, such as, $Client_A$ 140, ..., $Client_N$ 149, because the VLAN associated with the one or more client devices has been changed from $VLAN_1$ 150 to $VLAN_2$ 155 the IP address will not be released. DHCP server 160 maintains a VLAN identified associated with each client device. Accordingly, the DHCP server will detect a mismatch between the current VLAN (e.g. $VLAN_2$ 155) assigned to the one or more client devices and the VLAN corresponding to the assigned IP address (e.g. $VLAN_1$ 150) in the DHCP release message(s) received form the one or more client devices. When such mismatch is detected by DHCP server 160, DHCP server 160 will not release the IP address in the DHCP release message. This can potentially lead to DHCP address pool exhaustion for $VLAN_1$ 150. Therefore, if other client devices attempt to send a DHCP request for an IP address associated with VLAN, 150, the DHCP request may be denied due to the DHCP address pool exhaustion.

To solve the DHCP pool exhaustion problem, embodiments of the present disclosure can detect that a client device is no longer using an IP address associated with a particular VLAN, and therefore perform an artificial DHCP release with a corresponding identifier of the particular VLAN, on behalf of the client device, to release the IP address previously assigned to the client device by DHCP server 160.

Inter-Controller Client Information Share

Figure 2:
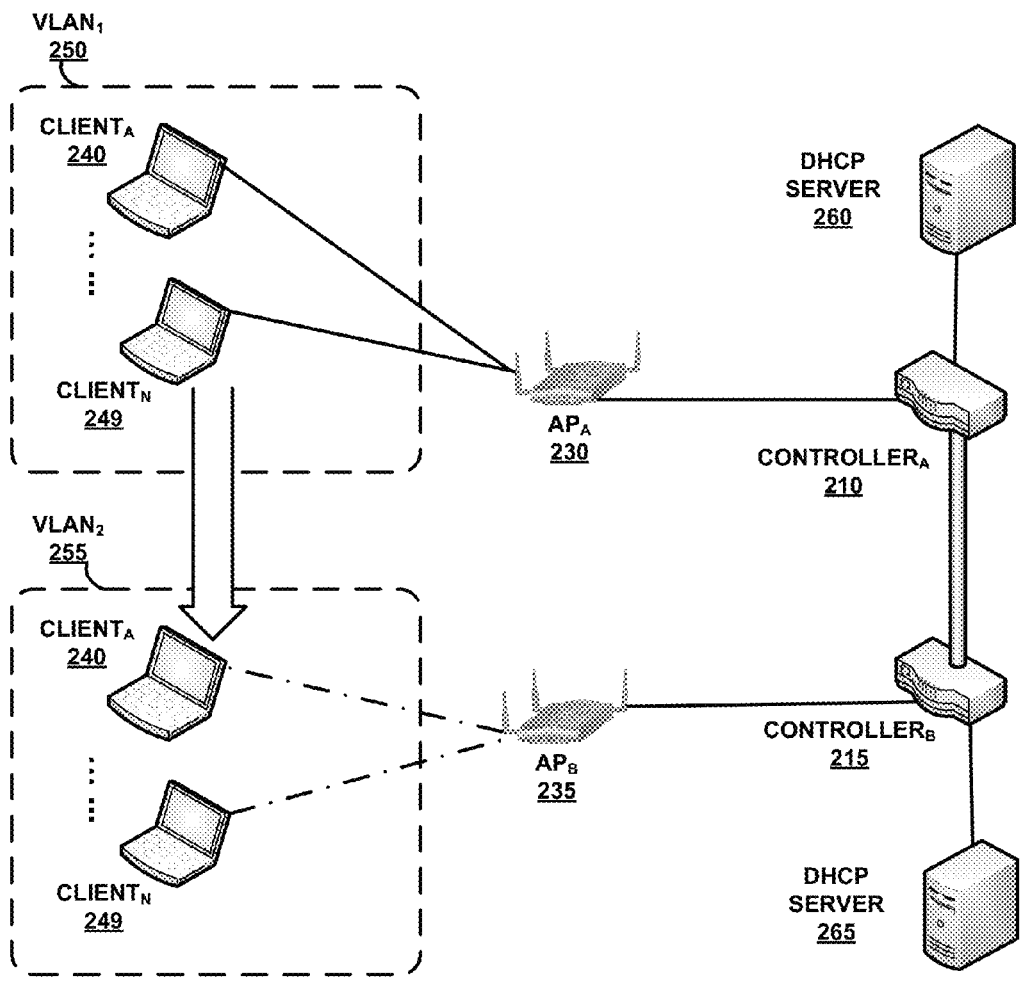
FIG. 2 shows another exemplary network environment according to embodiments of the present disclosure.

FIG. 2 shows another exemplary network environment according to embodiments of the present disclosure. Specifically, FIG. 2 illustrates a network that includes at least two DHCP servers (namely, DHCP server 260 and DHCP server 265), at least two network controllers (namely, Controller$_A$ 210 and Controller$_B$ 215), a number of access points (APs) (such as, AP$_A$ 230 and AP$_B$ 235), and a plurality of client devices, such as Client$_A$ 240, . . . , Client$_N$ 249, etc. In addition, wireless local area network (WLAN) illustrated in FIG. 2 is partitioned into a number of virtual local area networks (VLANs), including but not limited to, VLAN$_1$ 250 and VLAN$_2$ 255.

Each access point serves one or more client devices. Also each client device may belong to a particular VLAN. As illustrated in FIG. 2, a plurality of client devices, such as Client$_A$ 240, . . . , Client$_N$ 249, initially associate with AP$_A$ 230 that is connected to Controller$_A$ 210. Moreover, assuming that when each of the client devices associate with AP$_A$ 230, Controller$_A$ 210 assigns each client device to VLAN$_1$ 250. Therefore, when a client device, e.g., ClientA 240, sends a DHCP request, APA 230 will forward the request to DHCP server 260 based on the corresponding VLAN assignment to Client$_A$ 240. Next, DHCP server 260 will assign an available IP address to Client$_A$ 240 up receiving the DHCP request. The available IP address will be selected from an address pool that is reserved for VLAN1 250 and maintained by DHCP server 260.

Now, one or more client devices, such as Client$_A$ 240, . . . , Client$_N$ 249, change from one VLAN to another VLAN. The VLAN assigned for the one or more client devices may change due to a change of authorization. For example, a Pre-boot eXecution Environment (PXE) client after boot can undergo an authentication in compliance with IEEE 802.1x standard, and obtain a new role and/or a new VLAN assignment.

As a result, the one or more client devices will each send a new DHCP request for a new IP address that corresponds to the new VLAN. In some embodiments, as illustrated in FIG. 1, the client devices may disassociate with AP$_A$ 130 and establish association with another AP (e.g., AP$_B$ 135) after VLAN changes. The new AP (e.g., AP$_B$ 135) may be managed by a different network controller (e.g., Controller$_B$ 215) than the network controller (e.g., Controller$_A$ 210) that manages AP$_A$ 130.

In this example, the different network controller, e.g., Controller$_B$ 215, determines that client devices belong to a new VLAN, e.g., VLAN$_2$ 255, after the change of authorization. Therefore, each client device will need to send a new DHCP request in order to be assigned a new IP address corresponding to VLAN$_2$ 255. The new DHCP request will be forwarded by Controller$_B$ 215 to DHCP server 265. When DHCP server 265 receives the new DHCP requests from the client devices, DHCP server 265 will assign an available IP address from an address pool that is reserved for VLAN$_2$ 255 to each client device.

According to embodiments of the present disclosure, each network controller maintains a user entry when a client device initially connects to the network. The user entry may include, for example, the client device's Media Access Control (MAC) address, the client device's IP address, a VLAN identifier, a flag indicating whether the client device's IP address is dynamically or statically assigned, the IP address of the DHCP server assigning the client device's IP address, etc. Each time when the client device requests a new IP address, a new user entry is created for the client device. Likewise, after each successful release of dynamic IP address, the client device's corresponding user entry will be removed. Moreover, the network controllers (e.g., Controller$_A$ 210 and Controller$_B$ 215) can share the user entries and DHCP server information among each other. Thus, the network controllers can detect whether and when a particular client device has moved from one VLAN to a different VLAN based on user entry changes.

Detection of VLAN Membership Change

Assuming that initially a client device, such as Client$_A$ 240, belongs to VLAN$_1$ 250, and that the client device is assigned a DHCP IP address IP$_X$. Subsequently, the client device changes its VLAN membership from VLAN$_1$ 250 to VLAN$_2$ 255. When the client device sends a DHCP release message to release IP$_X$, the DHCP release message will include at least the client device's IP address IP$_X$ and MAC address MAC$_Y$. The DHCP release message will then be received by a network switch. The network switch looks up the current VLAN identifier for the client device (e.g., VLAN$_2$ 255) and tags the DHCP release message with the current VLAN identifier for the client device. Next, the network switch forwards the DHCP release message to DHCP server 260. Thus, the forwarded DHCP release message includes IP$_X$, MAC$_Y$, and VLAN$_2$ 255.

The forwarded DHCP release message will eventually be received by DHCP server 260. However, on DHCP sever 260, the IP address IP$_X$ belongs to the DHCP address pool for VLAN$_1$ 250. Therefore, DHCP server 260 will detect a mismatch in the VLAN identifier (e.g., VLAN$_1$ 250) corresponding to IP$_X$ and the VLAN identifier (e.g., VLAN$_2$ 255) in the DHCP release message received from the client device (e.g., Client$_A$ 240). Whenever a mismatch is detected by DHCP server 260, DHCP server 260 will not release the IP address IP$_X$.

According to embodiments of the present disclosure, to avoid such problem in DHCP release after the VLAN membership of a client device changes, a network device, such as, a network controller and/or switch device can snoop DHCP messages transmitted by the one or more client devices, for example, by monitoring network traffic transmitted through a particular User Datagram Protocol (UDP) port.

Furthermore, the network controller and/or switch device can maintain an authentication database, which extracts and adds the client device information when a client device establishes a connection to a network or sub-network. The network controller and/or switch device can also update the client device information when a subsequent packet is received from the client device via the particular UDP port.

There are at least two ways that the network controller and/or switch device can detect a VLAN membership change for the client device. First, the network controller and/or switch device can determine whether a message received via the particular UDP port is a DHCP release message based on a message type field in received message. If the message is a DHCP release message, the network controller and/or switch device can further extract additional information from the received message. The additional information may include, but is not limited to, a user name, a MAC address of the client device based on the source MAC address in the packet, an IP address of the client device based on the source IP address in the packet, a DHCP server IP address based on the destination IP address in the packet, and whether the IP address is dynamically or statically assigned.

Next, prior to forwarding the DHCP release message, the network controller and/or switch device can compare the extracted additional information with the information corresponding to the client device in the authentication database to determine whether a mismatch exists between the VLAN identifier corresponding to the IP address of the client device and the VLAN on which the message is received by the network controller and/or switch device.

The second way that the network controller and/or switch device can detect the VLAN membership change by monitoring network traffic transmitted by the client device. When the VLAN membership for a client device changes, the client device will send a DHCP request for a new IP address. Once the new IP address is assigned to the client device, the client device will be using the new IP address as the source IP address in all network packets originated by the client device. Therefore, the network controller and/or switch device can snoop the network traffic from the client device and detect that the client device has been using the new IP address to transmit network messages. Hence, the network controller and/or switch device can safely assume that the client device no longer uses the old IP address corresponding to the previously assigned VLAN for the client device after receiving a threshold number of messages originated from the client device having the new IP address as the source IP address. Accordingly, the network controller and/or switch device can perform a DHCP release on behalf of the client device.

Note that, in the above scenario where the second approach is adopted, no DHCP release message is ever received from the client device. The network controller and/or switch device will need to generate a new DHCP release message on behalf of the client device rather than modifying a received DHCP release message from the client device.

DHCP Release on Behalf of User

According to embodiments of the present disclosure, whenever the network controller detects that a client device has a changed VLAN membership, the network controller will perform a DHCP release, on behalf of the client device, to release the IP address previously assigned to the client device.

First, if a DHCP release message is received from a client device but a mismatch in the VLAN identifier is detected between the VLAN via which the message is received (i.e., the current VLAN of the client device) and the VLAN identified by a VLAN identifier corresponding to the IP address in the DHCP release message, the network controller and/or switch device will replace the VLAN identifier in the DHCP release message with the VLAN identifier corresponding to the client device's IP address as maintained in the authentication database. The network controller and/or switch device then transmit the DHCP release message with the changed VLAN identifier to the DHCP server.

Second, if no DHCP release message is received but the network controller and/or switch device has received at least a threshold number of messages originated from the client device using a new IP address, the network controller and/or switch device will generate a DHCP release message on behalf of the client device to release the old IP address corresponding to the client device's previously assigned VLAN. Specifically, the network controller and/or switch device will search the authentication database for a user entry corresponding to the client device, and retrieve from the user entry client device information, such as, the client device's MAC address, the client device's old IP address, the DHCP server's IP address, and the VLAN identifier. The network controller and/or switch will include such client device information retrieved from the user entry in the DHCP release message generated on behalf of the client device.

Figure 3:
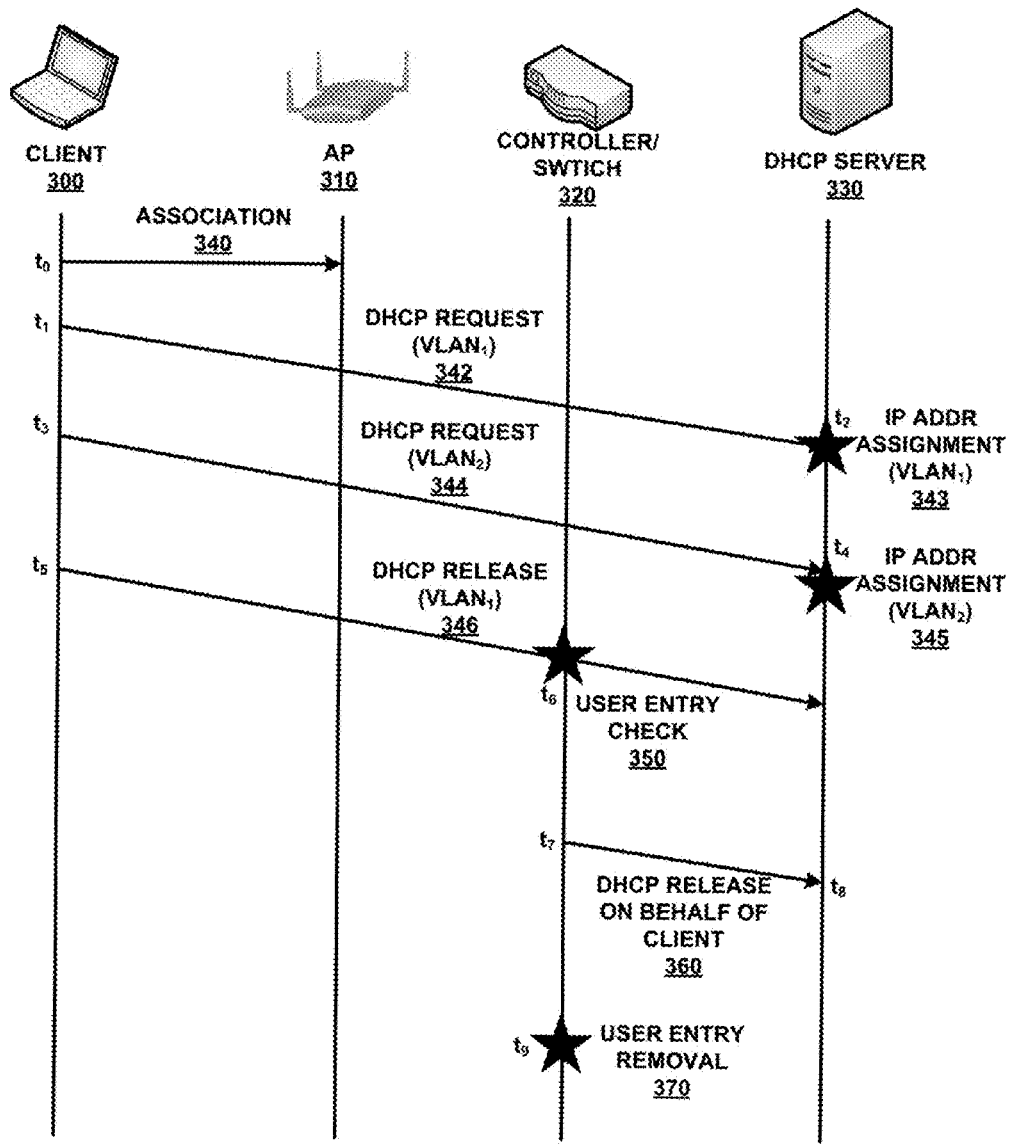
FIG. 3 shows an exemplary sequence diagram illustrating communication exchanges for performing DHCP release on behalf of a user according to embodiments of the present disclosure.

FIG. 3 shows an exemplary sequence diagram illustrating communication exchanges for performing DHCP release on behalf of a user according to embodiments of the present disclosure. Specifically, FIG. 3 includes at least a client device 300, an AP 310, a network controller/switch 320, and a DHCP server 330. At time point $t_0$, client device 300 transmits an association request 340 to AP 310, and connects to the WLAN. Subsequently, at time point $t_1$, client device 300 transmits a DHCP request 342 to DHCP server 330 in order to be assigned with a valid IP address. Note that, for illustration purposes only, at time point $t_1$, client device 300 is a member of $VLAN_1$. DHCP request 342 is forwarded by a number of network devices in the WLAN, such as AP 310, network controller/switch 320, and one or more other network devices (not shown). At time point $t_2$, when DHCP server 330 receives DHCP request 342, DHCP server 330 provides an IP address assignment 343 for client device 300. The IP address assigned to client device 300 at time point $t_2$ corresponds to $VLAN_1$. Thereafter, client device 300 can use the assigned IP address to transmit client data traffic on the $VLAN_1$.

Subsequently, at time point $t_3$ client device 300 sends another DHCP request 344 to DHCP server 330 in order to be assigned with a valid IP address corresponding to $VLAN_2$. Client device 300 may change its VLAN membership from $VLAN_1$ to $VLAN_2$ after a change of authorization, for example, due to a user role change after and IEEE 802 1x authentication. At time point $t_4$ when DHCP server 330 receives DHCP request 344, DHCP server 330 provides an IP address assignment 345 for client device 300. The IP address assigned to client device 300 at time point $t_4$ corresponds to VLAN2.

Furthermore, in some embodiments, client device 300 may send, at time point $t_6$, a DHCP release message 346 to release the previously assigned IP address corresponding to $VLAN_1$. Note that, in some embodiments, client device 300 may not send any DHCP release message to release the previously assigned VLAN corresponding to $VLAN_1$. Instead, client device 300 may start using the newly assigned IP address to transmit data traffic.

At time point $t_6$, DHCP release message 346 and/or data traffic originated from client device 300 is received by network controller/switch 320. Network controller/switch then performs a user entry check 350. Specifically, if DHCP release message 346 is received by network controller/switch 320, network controller/switch can snoop DHCP release message 346 to determine whether a mismatch exists between the VLAN identifier corresponding to the IP address of the client device and the VLAN on which DHCP release message 346 is received by network controller/switch 320. If data traffic originated from client device 300 is received, network controller/switch 320 can detect the VLAN membership change by snooping the received message from client device 300 to determine whether client device 300 is using the new IP address as the source IP address, whereas the new IP address does not match client device 300's IP address in its corresponding user entry in the authentication database.

When the network has only one controller, network controller 320 will transmit a DHCP release 350 on behalf of client device 300 to DHCP server 330. If the network has more than one network controllers, network controller 320 may share the information with other network controllers to determine whether client device 300 has changed its VLAN membership.

Thereafter, at time point $t_7$, network controller/switch 320 will send a DHCP release message 360 on behalf of client device 300, which will be received by DHCP server 330. When a DHCP release message 346 is received from client device 300, network controller/switch 320 will replace the VLAN identifier in DHCP release message 346 with the VLAN identifier corresponding to the client device's IP address as stored in the authentication database prior to transmitting the DHCP release message 360 (which is modified from received DHCP release message 346) to DHCP server 330.

On the other hand, when no DHCP release message is received, but data traffic originated from client device 300 using newly assigned IP address is detected, network controller/switch 320 will generate a DHCP release message 360 on behalf of client device 300 to release the previously assigned IP address. Specifically, whenever a message with a new IP address is received by network controller/switch 320 from client device 300, network controller/switch 320 creates a new entry in the authentication database for client device 300. When the new user entry corresponding to client device 300 is created in the authentication database, network controller/switch 320 determines whether there is any other user entry corresponding to the same MAC address of client device 300. If so, network controller/switch 320 retrieves client device information, such as, the client device's previous IP address, the DHCP server's IP address, and the previous VLAN identifier from the previous user entry. Network controller/switch then insert such client device information retrieved from the previous user entry in DHCP release message 360 generated on behalf of client device 300 prior to transmitting DHCP release message 360 to DHCP server 330. DHCP release 360 typically is a unicast message with the IP address of client device 300 as the source IP address, and the IP address of DHCP server 330 as the destination IP address.

In some embodiments, the previous user entry will expire after a predetermined time period which can be configured by a network administrator. In some embodiments, if network controller/switch 320 receives an acknowledgement message from DHCP server 330 confirming the release of the IP address in DHCP release message 360.

Process for Performing DHCP Release on Behalf of User

Figure 4:
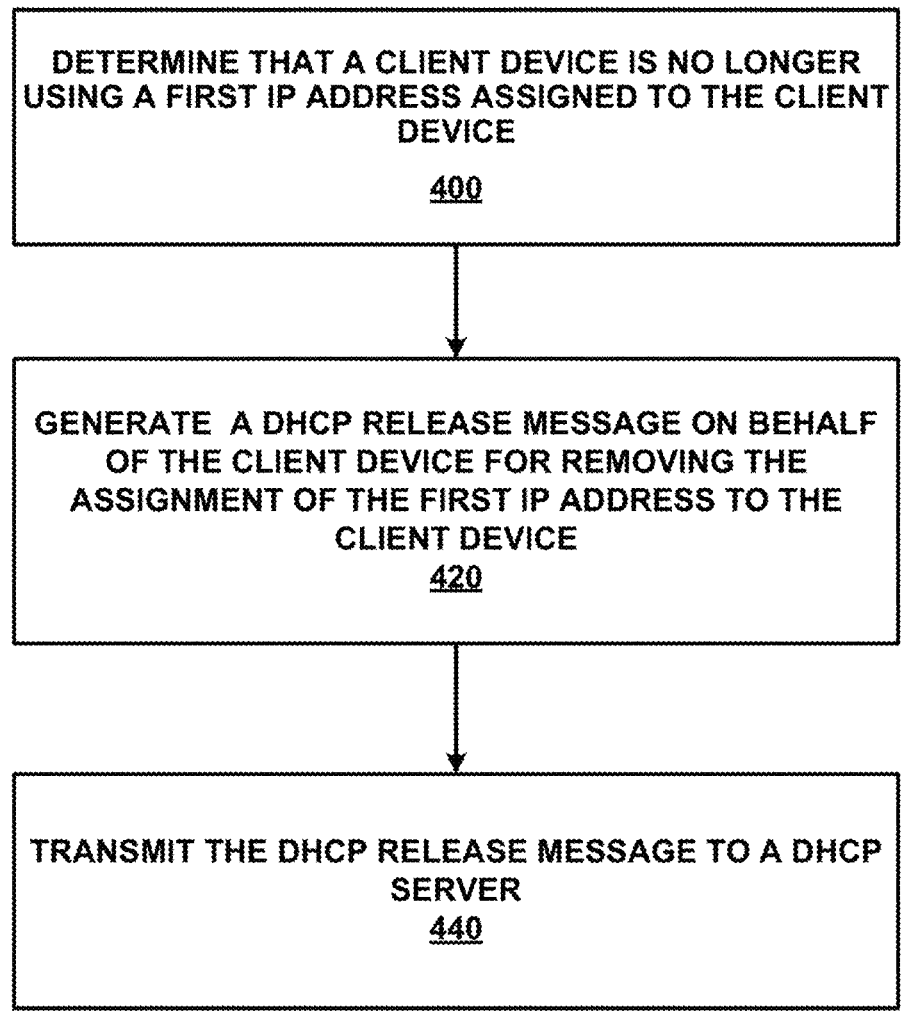
FIG. 4 shows an exemplary process for performing DHCP release on behalf of a user according to embodiments of the present disclosure.

FIG. 4 illustrates an exemplary process for performing DHCP release on behalf of a user according to embodiments of the present disclosure. During operations, a network device determines that a client device is no longer using a first Internet Protocol (IP) address assigned to the client device (operation 400). In response to the determining that the client device is no longer using the first IP address, the network device generates a DHCP release message on behalf of the client device for removing the assignment of the first IP address to the client device (operation 420). Thereafter, the network device transmits the DHCP release message to a DHCP server (operation 440).

Figure 5:
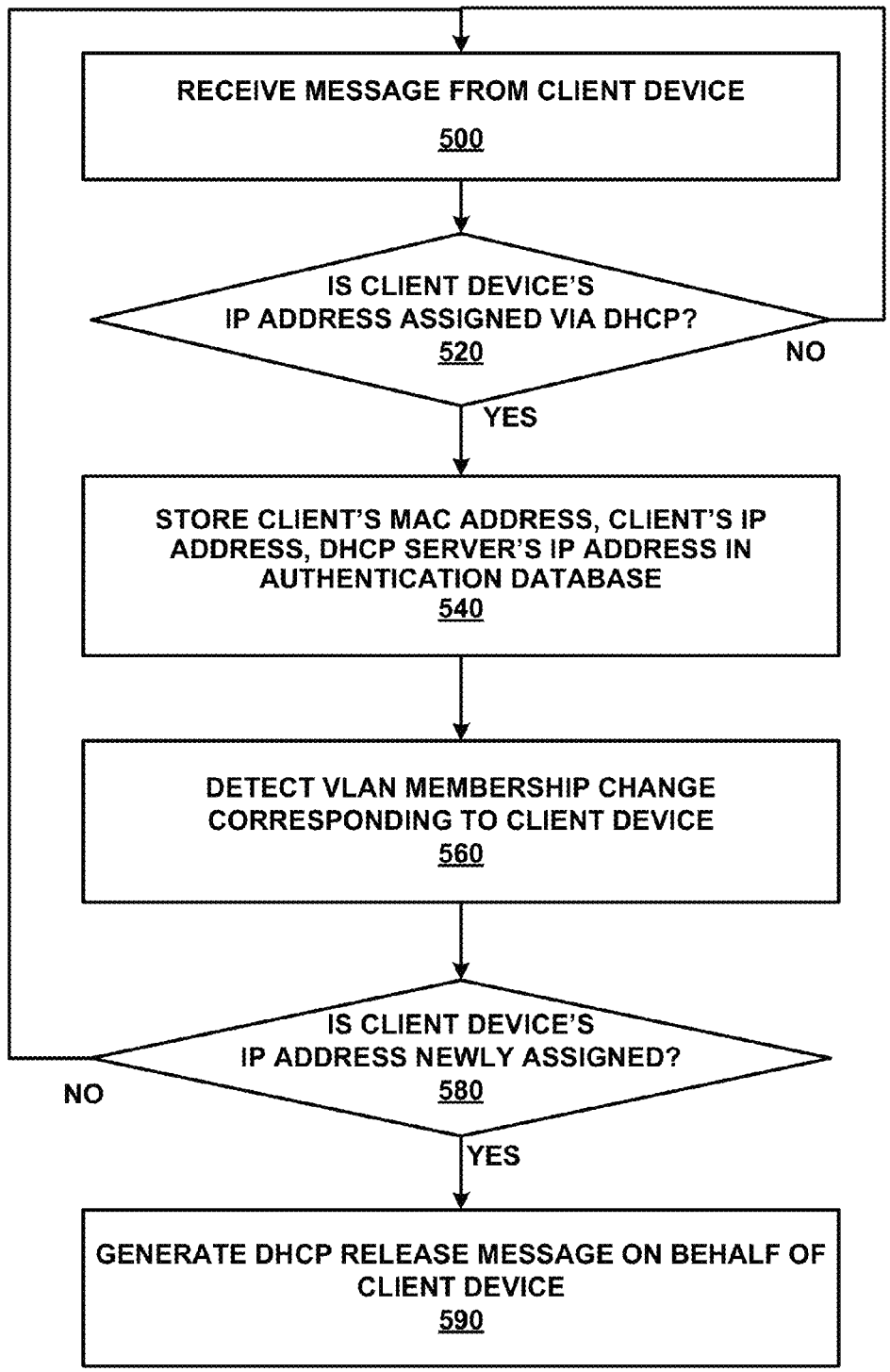
FIG. 5 shows an exemplary process for performing DHCP release on behalf of a user according to embodiments of the present disclosure.

More specifically, FIG. 5 illustrates a detailed process for performing DHCP release according to embodiments of the present disclosure. First, a network device receives a message from a client device (operation 500). The network device then determines whether the client device's IP address is assigned via DHCP based on the received message (operation 520). If so, the network device stores at least the client device's MAC address, the client device's IP address, and the DHCP server's IP address in an authentication database (operation 540). Otherwise, the network device continues to monitor network traffic from the client device.

Subsequently, the network device detects a VLAN membership change corresponding to the client device (operation 560). The network device then determines whether the client device's IP address is newly assigned (operation 580). If so, the network device will generate a DHCP release message on behalf of the client device (operation 590). Otherwise, the network device continues to monitor network traffic from the client device.

In some embodiments, the network device determines that the client device is no longer using the first IP address by determining that the client device has switched from a first VLAN corresponding to the first IP address to a second VLAN that is different than the first VLAN. The determination that the client device is no longer using the first IP address may be performed by a switch, a controller, and/or a particular access point with which the client device was associated while using the first IP address.

In some embodiments, the network device determines that the client device is no longer using the first IP address by determining that a second IP address, different than the first IP address, has been assigned to the client device.

In some embodiments, the determination that the client device is no longer using the first IP address is performed by snooping packets transmitted by the client device and determining that the client device is using a second IP address different than the first IP address.

In some embodiments, the network device determines that the client device is no longer using the first IP address by determining that a DHCP release message corresponding to a first VLAN is transmitted by the client device while the client device is on a second VLAN different than the first VLAN. The DHCP release message may identify a MAC address of the client device and the first IP address.

In some embodiments, the DHCP release message, generated on behalf of the client device, identifies the client device as a source of the DHCP release message.

System for Performing DHCP Release on Behalf of User

Figure 6:
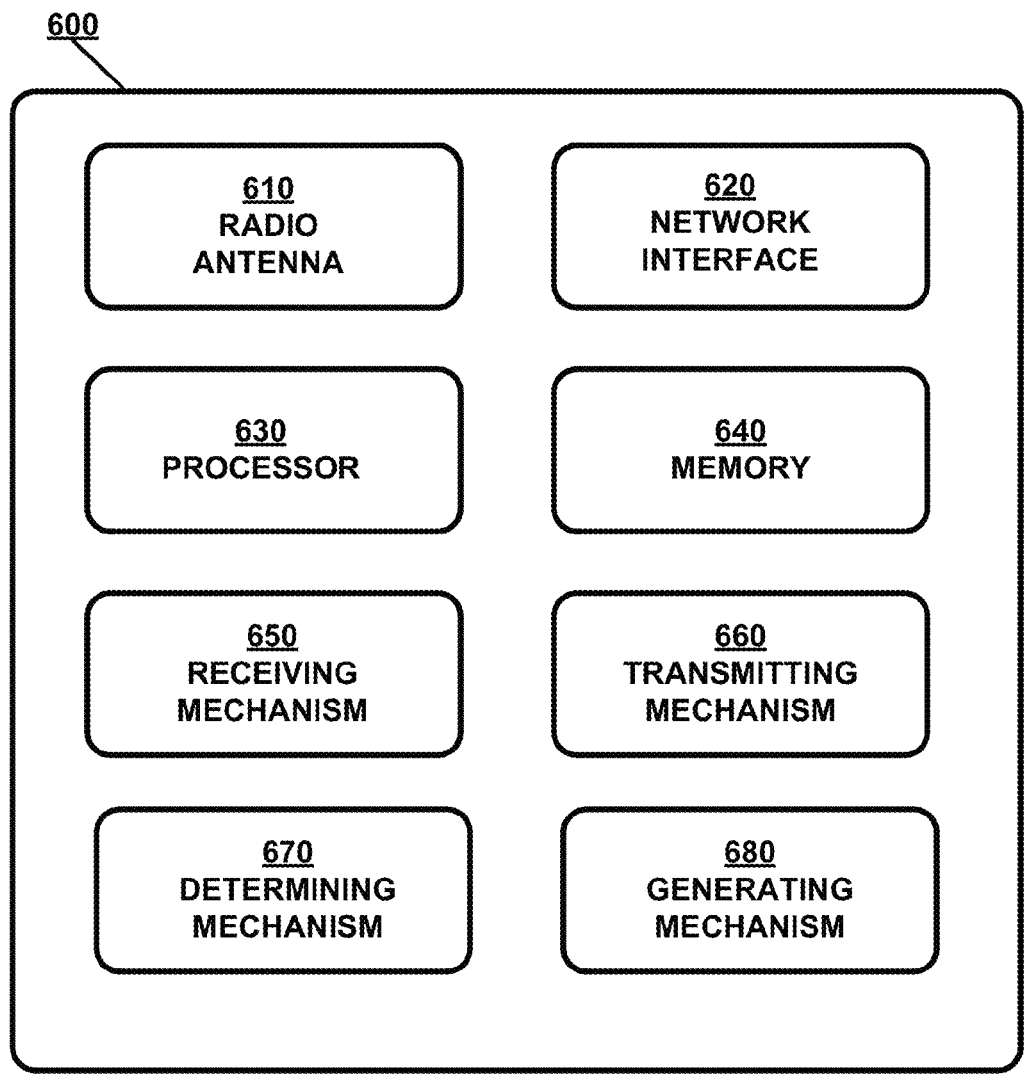
FIG. 6 is a block diagram illustrating an exemplary system for performing DHCP release on behalf of a user according to embodiments of the present disclosure.

FIG. 6 is a block diagram illustrating a system for performing DHCP release on behalf of a user according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a determining mechanism 670, and a generating mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on.

Transmitting mechanism 660 generally transmits messages, which include, but are not limited to, requests and/or responses, beacon frames, management frames, control path frames, and so on. Specifically, transmitting mechanism 660 can transmit a DHCP release message to a DHCP server on behalf of a client device.

Determining mechanism 670 generally determines that a client device is no longer using a first Internet Protocol (IP) address assigned to the client device. Specifically, determining mechanism 670 can determine that the client device has switched from a first VLAN corresponding to the first IP address to a second VLAN that is different than the first VLAN. Note that, determining that the client device is no longer using the first IP address can be performed by determining mechanism 670 of a switch, a controller, and/or a particular access point with which the client device was associated while using the first IP address.

In some embodiments, determining mechanism 670 determines that a second IP address, different than the first IP address, has been assigned to the client device. In some embodiments, determining mechanism 670 makes its determination by snooping packets transmitted by the client device and determining that the client device is using a second IP address different than the first IP address.

In some embodiments, determining mechanism 670 determines that a DHCP release message, corresponding to a first VLAN, that is transmitted by the client device while the client device is on a second VLAN different than the first VLAN.

Generating mechanism 680 generally generates a DHCP release message on behalf of the client device. Specifically, generating mechanism 680 can generate a DHCP release message on behalf of the client device for removing the assignment of the first IP address to the client device in response to determining mechanism 670 determining that the client device is no longer using the first IP address.

In some embodiments, the DHCP release message identifies a MAC address of the client device and the first IP address. In some embodiments, the DHCP release message, generated on behalf of the client device, identifies the client device as a source of the DHCP release message.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions to:
    determine that a client device is no longer using a first Internet Protocol (IP) address, wherein the first IP address is assigned to the client device and dedicated to a first Virtual Local Area Network (VLAN);
    responsive to determining that the client device is no longer using the first IP address, generate a Dynamic Host Configuration Protocol (DHCP) release message on behalf of the client device; and
    transmit the DHCP release message to a DHCP server,
    wherein the instructions to determine that the client device is no longer using the first IP address comprise instructions to, responsive to receiving the DHCP release message, determine a VLAN identifier of the client device,
    wherein the instructions to generate the DHCP release message comprise instructions to:
        determine that the VLAN identifier of the client device is different than a VLAN identifier associated with the first VLAN; and
        responsive to determining that the VLAN identifier of the client device is different than the VLAN identifier associated with the first VLAN, modify the DHCP release message by replacing the VLAN identifier of the client device with the VLAN identifier associated with the first VLAN,
    wherein the instructions to transmit the DHCP release message comprise instructions to transmit the modified DHCP release message.

2. The medium of claim, 1, wherein the instructions to determine that the client device is no longer using the first IP address comprise instructions to determine that the client device has switched from the first VLAN to a second VLAN,
    wherein an IP address pool is dedicated to the second VLAN, wherein the address pool does not include the first IP address.

3. The medium of claim 1, wherein the instructions to determine that the client device is no longer using the first IP address comprise instructions to determine that a second IP address has been assigned to the client device, wherein the second IP address is different than the first IP address.

4. The medium of claim 1, wherein the instructions to determine that the client device is no longer using the first IP address comprise instructions to:
    snoop packets transmitted by the client device; and
    determine that the client device is using a second IP address, wherein the second IP address is different than the first IP address.

5. The medium of claim 1, wherein the instructions to determine that the client device is no longer using the first IP address comprise instructions to determine that the DHCP release message, corresponding to the first VLAN, is transmitted by the client device while the client device is on a second VLAN, wherein the second VLAN is different than the first VLAN.

6. The medium of claim 1, wherein the instructions to generate the DHCP release message comprise instructions to generate the DHCP release message identifying a MAC address of the client device.

7. The medium of claim 1, wherein the instructions to generate the DHCP release message comprise instructions to generate the DHCP release message identifying the client device as a source of the DHCP release message even though the DHCP release message is not generated by the client device.

8. The medium of claim 1, wherein the instructions to generate the DHCP release message comprise instructions to, responsive to not receiving the DHCP release message from the client device and receiving a threshold number of messages originating from the client device using a second IP address,
    generate the DHCP release message, wherein the DHCP release message comprises the VLAN identifier associated with the first VLAN.

9. A network device comprising:
    processing resource; and
    a memory resource storing machine readable instructions to cause the processing resource to:
        determine that a client device is no longer using a first Internet Protocol (IP) address, wherein the first IP address is assigned to the client device and dedicated to a first Virtual Local Area Network (VLAN);
        responsive to determining that the client device is no longer using the first IP address, generate a Dynamic Host Configuration Protocol (DHCP) release message on behalf of the client device; and
        transmit the DHCP release message to a DHCP server,
        wherein the instructions to determine that the client device is no longer using the first IP address comprise instructions to, responsive to receiving the DHCP release message, determine a VLAN identifier of the client device,
        wherein the instructions to generate the DHCP release message comprise instructions to:
            determine that the VLAN identifier of the client device is different than a VLAN identifier associated with the first VLAN; and
            responsive to determining that the VLAN identifier of the client device is different than the VLAN identifier associated with the first VLAN, modify the DHCP release message by replacing the VLAN identifier of the client device with the VLAN identifier associated with the first VLAN,
        wherein the instructions to transmit the DHCP release message comprise instructions to transmit the modified DHCP release message.

10. The system network device of claim 9, wherein the memory resource stores further machine readable instructions to cause the processing resource to determine that the client device has switched from the first VLAN to a second VLAN,
    wherein an IP address pool is dedicated to the second VLAN, wherein the address pool does not include the first IP address.

11. The network device of claim 9, wherein the network device is a switch.

12. The network device of claim 9, wherein the network device is a controller.

13. The network device of claim 9, wherein the memory resource stores machine readable instructions to cause the processing resource to determine that a second IP address has been assigned to the client device, wherein the second IP address is different than the first IP address.

14. The network device of claim 9, wherein the memory resource stores machine readable instructions to cause the processing resource to:
   snoop packets transmitted by the client device; and
   determine that the client device is using a second IP address, wherein the second IP address is different than the first IP address.

15. The network device of claim 9, wherein the memory resource stores machine readable instructions to cause the processing resource to determine that the DHCP release message, corresponding to the first VLAN, is transmitted by the client device while the client device is on a second VLAN, wherein the second VLAN is different than the first VLAN.

16. The network device of claim 9, wherein the DHCP release message, generated by the network device, identifies a MAC address of the client device.

17. The network device of claim 9, wherein the DHCP release message identifies the client device as a source of the DHCP release message even though the network device generated the DHCP release message.

* * * * *